United States Patent [19]
VanZante et al.

[11] Patent Number: 6,079,034
[45] Date of Patent: Jun. 20, 2000

[54] HUB-EMBEDDED SYSTEM FOR AUTOMATED NETWORK FAULT DETECTION AND ISOLATION

[75] Inventors: Craig A. VanZante; Robert L. Faulk, Jr., both of Roseville; Douglas E. O'Neil, Auburn, all of Calif.

[73] Assignee: Hewlett-Packard Company, Palo Alto, Calif.

[21] Appl. No.: 08/986,077

[22] Filed: Dec. 5, 1997

[51] Int. Cl.[7] .................................................. H04B 3/36
[52] U.S. Cl. ........................................... 714/48; 709/224
[58] Field of Search .................. 714/1–57; 709/200–253

[56] References Cited

U.S. PATENT DOCUMENTS

| | | | |
|---|---|---|---|
| 5,315,590 | 5/1994 | Vijeh et al. | 370/79 |
| 5,392,285 | 2/1995 | Kurts | 370/85.2 |
| 5,396,495 | 3/1995 | Moorwood et al. | 370/85.11 |
| 5,535,193 | 7/1996 | Zhang et al. | 370/17 |
| 5,568,476 | 10/1996 | Sherer et al. | 370/60 |
| 5,606,664 | 2/1997 | Brown et al. | 395/200.1 |
| 5,680,404 | 10/1997 | Gray | 371/5.1 |
| 5,751,715 | 5/1998 | Chan et al. | 370/455 |
| 5,812,754 | 9/1998 | Lui et al. | 395/182.04 |
| 5,822,303 | 10/1998 | Carter et al. | 370/246 |
| 5,832,503 | 11/1998 | Malik et al. | 707/104 |
| 5,881,237 | 3/1999 | Schwaller et al. | 395/200.54 |

*Primary Examiner*—Ayaz R. Sheikh
*Assistant Examiner*—Jigar Pancholi

[57] ABSTRACT

An automatic loop-elimination system embodied in a network hub minimizes the impact of port deactivation by deactivating only one port at a time. To reduce the likelihood of concurrent examination of ports (of different hubs) coupled to other hubs, the port at which examination begins is randomized at network startup. To reduce the likelihood of concurrently examined ports (of different hubs) being deactivated at the same time, a brief re-poll of port utilization is run just before deactivation; if the first deactivation eliminates the loop, the second port is not deactivated. For each hub, the method cycles through the ports three times, progressively including more heavily cascaded ports. This progressive relaxation of a cascade constraint preferentially deactivates ports coupled to end-node devices before ports coupled to other hubs. Thus, the invention provides for fast and convenient automatic loop elimination without requiring external hardware or software. The network management system applies to network problems other than loops and to automatic corrective actions that merely filter, rather than disable, a port.

11 Claims, 5 Drawing Sheets

HUB-EMBEDDED SYSTEM FOR AUTOMATED NETWORK FAULT DETECTION AND ISOLATION

BACKGROUND OF THE INVENTION

The present invention relates to computer networks and, more particularly, to a system for managing such networks. A major objective of the invention is to provide for automated port disablement to eliminate loops and other network-performance related problems.

Networks provide for communications among computer-related node devices, for example, computers, computer peripherals (e.g., printers), and various types of instrumentation (e.g., medical instrumentation). While there are peer-to-peer networking systems, most sophisticated networks require one or more network hubs that are external to the computers and help manage inter-device communications.

A typical hub has three or more ports, each of which can be coupled to a node device or another hub by a suitable cable. There are many types of hubs, including repeaters, switches, and routers. Routers and switches direct what is received only out the port or ports required for the data to reach its destination. Repeaters broadcast whatever is received at one port out the remaining ports. Unlike switches and routers, repeaters do not analyze through-going data to determine where to send it. Accordingly, they tend to be simpler and faster. As a result, they are the numerically most prevalent type of hub. Although all types of hubs are addressed herein, repeaters are the primary focus herein.

Just as individuals rely increasingly on computers for getting their work done, corporations rely increasingly on networks for getting their personnel to work cooperatively. When a network fails, group efforts grind to a halt, as do individual efforts relying on network resources. Accordingly, maintaining a network working and performing at optimal levels is highly desirable, if not critical.

To aid in the detection and diagnosis of network problems, network hubs typically include a number of counters that detect and count events bearing on network performance. Some counters are dedicated to respective ports, while others count events regardless of the receiving port. For example, one type of port-dedicated counter detects and counts received packets that are longer than permitted by the network protocol. By sampling such a counter at two different times, a measure of the frequency of excessively long packets is derived. If this frequency is itself excessive, it indicates that a connected node has a problem. For example, either an included network interface card (NIC) or a software driver for the card is defective.

For a second example, a collision counter can be used to indicate a condition in which network bandwidth is being exceeded. Sophisticated network protocols can handle many concurrent transmissions and the assignment of priority according to data type. In general, data is transmitted one packet at a time. If two packets happen to be transmitted on the same cable concurrently, they are said to "collide". Sophisticated networks detect such collisions and require the transmitters to re-send the colliding packets at different times. An excessive frequency of collisions indicates that the network capacity is being exceeded. Other examples include the use of late-event counters to indicate the presence of excessively long cables or an excessive number of repeaters connected in series, and the use of counters that detect various types of packet defects to indicate a defective cable.

A network problem of particular interest herein is the elimination of network loops. Since a hub can include many ports, it can and does happen that a first port will be cabled directly to a second port of the same hub. In the case of a repeater loop, data received at the first port is transmitted out the second port; the same data is received again at the first port and is transmitted again out the second port and so on. This condition is known as a "local loop". Unless otherwise addressed, a local loop causes collisions to occur with every packet and re-sending does not avoid this problem. This condition can result in complete failure of the network (or network segment). Local loops are readily detectable since every packet results in a collision.

Modern repeaters include hardware that automatically autopartitions ports to break local loops so that a network can sometimes continue operation. A packet received at an autopartitioned port is not transmitted out the remaining ports; however, the port is monitored for collisions. If this monitoring suggests the absence of problems, the autopartition can be automatically terminated (as specified in IEEE Std. 802.3). However, this automatic termination of partitions sometimes occurs when a loop is still present; thus, reliable network operation is not enabled in the presence of loops.

There are also non-local "indirect" loops that involve a hub and at least one other device. For example, two hubs can be coupled to each other at two different ports. For another example, a cabling error can cause a group of hubs that are supposed to be daisy-chained to be arranged into a loop. There are innumerable other types of loops, including loops that extend through node devices in various ways.

In part due to the variety of indirect loops, they can be hard to detect. While they tend to involve large numbers of collisions, there are other causes of collisions. Thus, while many hubs include counters that count collisions, the cause of the collisions is not readily determined. In part due to packet transit delays through other devices, it is more difficult to determine when a collision involves a packet colliding with itself. Thus, autopartitioning may not be activated in the event of an indirect loop. Accordingly, indirect loop detection has been the province of a network administrator using specialized network monitoring tools.

Network monitoring tools tend to be difficult to set up and difficult to use. In some cases, specialized network diagnostic hardware is required. In other cases, a general-purpose workstation is configured with special software as a network administration station. The network software tends to be arcane, requiring specially skilled network administrators to operate.

Often, the required set up for the network monitoring tools is never performed or is not performed correctly. As a result, consultants must be brought in to fix an impaired network. Thus, correcting indirect loops can be expensive, both for the labor involved but also in the loss of productivity for the users of the network. What is needed is an improved system for detecting and correcting for loops and other network problems impairing operation and performance.

SUMMARY OF THE INVENTION

The present invention provides for a hub that automatically restricts a port when it determines that doing so is likely to maintain network performance at an acceptable level. A port is "restricted" when some or all of the data available for reception at that port for retransmission from one or more other ports is prevented from being so retransmitted. Restriction can involved filtering some data, or partitioning of the port, or disabling the port.

An important objective is to implement the restriction in a manner that best preserves the functionality of the network. Often a problem affects more than one hub and sometimes affects more than one port of a hub. Instead of restricting all ports involved in a problem at once, it is preferable to restrict one port at a time, and checking to determine if the problem persists before restricting another port. There are two aspects to this objective: 1) only one port involved in a problem should be restricted at a time ("ordered restriction"); and 2) less important ports should be restricted before more important ports ("prioritized restriction"). The following discussion focuses on disabling ports involved in loops; however, it should be understood that the invention provides analogously for less severe restrictions and problems other than loops.

The invention provides for "ordered restriction". Thus, if a hub includes two ports involved in a loop, only one is disabled. If further checking indicates that the loop remains in effect despite shutdown of the first port, the second port can then be shut down. Typically, a loop is identified by monitoring counters that track events associated with loops (as well as other network problems). For example, an excessive number of packets occurring over a fixed-time interval can be used to indicate the presence of a loop. The present invention provides that the time intervals at which the ports are sampled are staggered so that only one port is being evaluated for disabling at a time.

A further challenge is to prevent two ports belonging to different hubs from being turned off at the same time. One way to do this is for two hubs to coordinate their port shutdown procedures. However, the present invention minimizes the likelihood of two ports of two different hubs being disabled concurrently even where the port shutdown procedures of the respective hubs are not coordinated.

One approach the invention takes to the ordered shutdown of ports is to stagger the times loop determinations are made for corresponding ports of different hubs. For various reasons, including human and device proclivities, certain ports of one hub are more likely to be coupled to certain ports of another hub. Thus, for example, the port 1s of the hubs of a network are more likely to be coupled to other hubs than are the port 4s of the hubs. If all the port is are checked for loops concurrently, there is a greater likelihood that two will be shutdown concurrently than there would be if not all concurrently-checked ports have the same port number.

If the loop detection is managed on a system-wide basis, there are many ways of ensuring that corresponding ports are not checked concurrently. The present invention provides randomizing selection of the first port to be checked for each hub so that the chances of corresponding ports being checked concurrently are low. In practice, randomization is achieved by generating a pseudo-random number based on a seed that is unique or at least not widely shared, such as all or part of a media access control address. This, in combination with the next technique described, renders negligible the likelihood of two corresponding ports of the respective hubs being disabled concurrently.

The present invention provides for dividing a time interval over which a port is monitored for loop indications into a first long interval and a second brief interval. If the counts for the first long interval indicate the presence of a loop, the brief re-poll is conducted to determine whether or not the loop still appears to be present. If turning off a port of one hub breaks a loop, the re-poll prevents a concurrently checked port of a second hub from being shut down. Thus, randomized port checking and quick re-polling work together to minimize the likelihood that more than one port is shut down at a time, even for a network with many hubs.

Prioritized shutdown is achieved in part by distinguishing between ports that are coupled to hubs and ports that are coupled to node devices. In some embodiments, the presence of a remote hub can be determined directly. However, even in networks in which the hubs are themselves "invisible" to each other, a hub can detect when multiple node devices seem to be transmitting to the same port. For example, a "cascade" counter can be used to count instances in which a source address is changed.

When a loop exists, the ports involved in the loop typically appear cascaded, i.e., coupled to multiple node devices. However, if the loop results from a recent problem associated with a node device, the port coupled to that device will appeared to have been cascaded more recently than ports coupled to hubs. Thus, the present invention provides for shutting down recently cascaded ports before ports that have been cascaded for a longer time.

In accordance with the foregoing, ordered shutdown is implemented using a temporal ordering, while prioritized shutdown relies on a priority ordering. To coordinate these two ordering schemes, the present invention iterates the temporal ordering at successively more relaxed priority levels. For example, during a first iteration, only ports that have not been acting as if they were cascaded recently can be considered for shutdown (depending on the confidence level of the loop indications); during a second iteration, weakly cascaded ports also can be considered for shutdown; and during a final iteration, all ports, including those that have been cascaded for a long time (and are thus, almost definitely coupled to other hubs) can be considered for shutdown.

While the invention has been discussed above primarily in the context of disabling ports involved in loops, it can equally be applied to other network problems. For example, prioritized and ordered port shutdown can be applied to determinations of a bad driver or network interface card based on a count of excessively long packets. For another example, prioritized and ordered port restriction can be applied to determinations of an excessive frequency of broadcast packets; in this case, the solution can be simply to filter out the broadcast packets.

The present invention provides a method for port restriction that is built into network hubs. The method restricts one port at a time and favors restriction of less important ports before more important ports. Thus, impact of the detected problem on network functionality is minimized. The restriction of one port at a time is achieved even for networks with two or more hubs and without coordination of the loop elimination method across hubs. Problem elimination is achieved quickly and with minimal impact on network functionality without dedicated external hardware, external software, expertise, and specialized setup procedures. These and other features and advantages of the invention are apparent from the description below, with reference to the following drawings.

DESCRIPTION OF THE PREFERRED EMBODIMENTS

Figure 1:
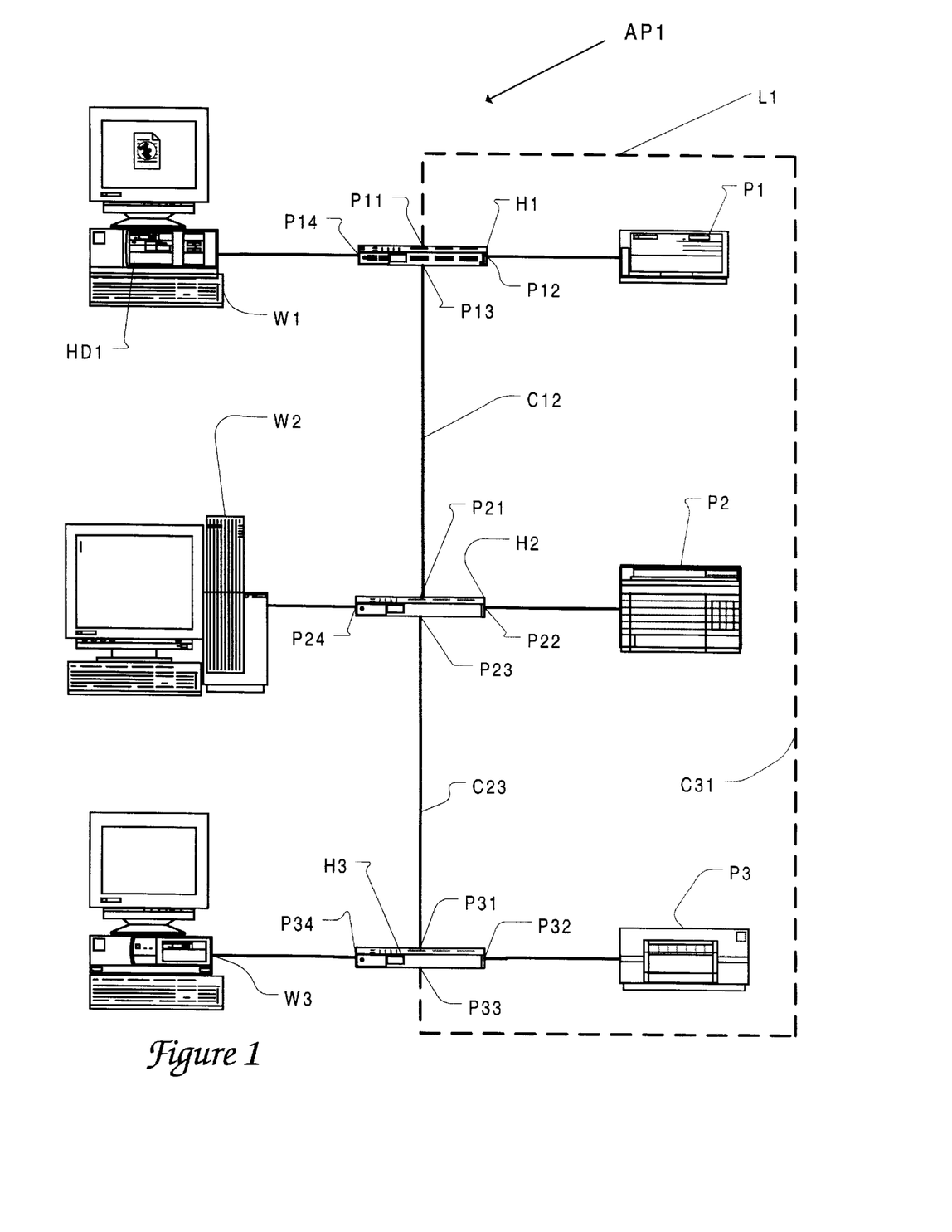
FIG. 1 is a schematic illustration of a network in accordance with the present invention. The dashed line represents a cable that has been recently and mistakenly connected to complete a network loop.

In accordance with the present invention, a network system AP1 includes three repeater hubs H1, H2, and H3, three computer workstations W1, W2, and W3, a monochrome laser printer P1, a color laser printer P2, and a color inkjet printer P3, and nine cables. Six of the nine cables are coupled to the six node devices W1, W2, W3, P1, P2, P3; the other three cables C12, C23, and C31, couple hubs. Cable C31 is shown dashed to indicate that it is recently coupled so as to complete a network-impairing loop.

Hub H1 has four ports, P11, P12, P13, and P14. Port P11 is recently coupled to hub H3 via cable C31. Port P12 is coupled to printer P1. Port P13 is coupled to hub H2 via cable C12. Port P14 is coupled to workstation W1.

Hub H2 has four ports, P21, P22, P23, and P24. Port P21 is coupled to port P13 of Hub H1 via cable C12. Port P22 is coupled to printer P2. Port P23 is coupled to hub H3 via cable C23. Port P24 is coupled to workstation W2.

Hub H3 has four ports, P31, P32, P33, and P34. Port 31 is coupled to port P23 via cable C23. Port 32 is coupled to printer P3. Port 33 is recently coupled to port P11 of hub H1 via cable 31. Port 34 is coupled to workstation W4.

Recently connected cable C31 completes a network loop L1. Loop L1 includes an original, non-problematic, data path out from hub H1 through its port P13, through cable C12, to hub H2 via its port P21, from hub H2 through its port P23, through cable C23, to hub H3 via its port P31. This data path is two-way, so that the foregoing order can be reversed. Cable 31 completes the unwanted loop by connecting hub H3 via its port P33 to hub H1 via its port P11. As a result, any data transmitted by any workstation W1, W2, W3, will be broadcast repeatedly by each hub H1, H2, H3.

Inactivating any of ports P11, P13, P21, P23, P31, or P33 can break the loop. The invention gives a preference for inactivating a recently cascaded port such as P11 or P33, which restores the intended configuration of network AP1.

Figure 2:
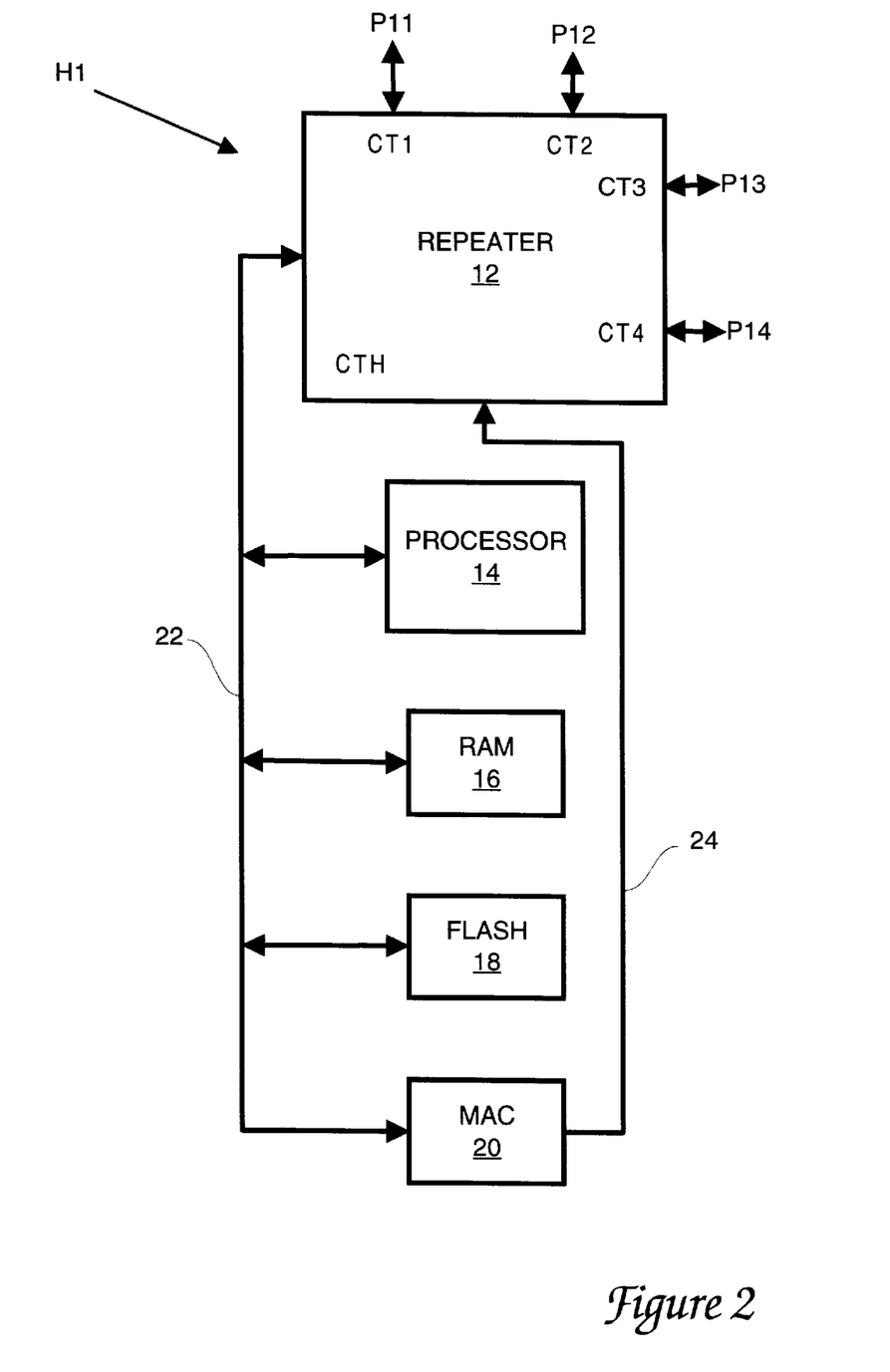
FIG. 2 is a schematic illustration of a hub of the network of FIG. 1 and in accordance with the present invention.

Hub H1 comprises a repeater circuit 12, a processor 14, volatile random access memory (RAM) 16, nonvolatile flash memory 18, and a media access controller (MAC) 20, all coupled to each other by a bus 22, as shown in FIG. 2. All four ports P11, P12, P13, P14, are coupled to repeater circuit 12. Repeater circuit 12 includes groups CT1, CT2, CT3, CT4 of counters, respectively dedicated to counting events received at ports P11, P12, P13, and P14. Flash memory 18 includes a hub-control program and stores a media-access control address for hub H1.

Of particular interest herein are "port utilization" counters for counting readable frames (rptrMonitorPortReadableFrames) and for counting readable octets (rptrMonitorPortReadableOctets), and "port cascade" counters for counting source address changes (rptrTrackSourceAddressChanges). The port counters are all defined in IETF RFC 2108, which references IEEE 802.3. Processor 14 maintains a "cascade" counter which measures the length of time the address change counter has been incrementing. Repeater circuit 12 also includes a group of counters CTH that count events regardless of the receiving port; these counters include "hub utilization" counters (based on IETF RFC 1757) for counting frames (etherStatsPkts) and for counting octets (etherStatsOctets).

The hub-control program is executed by processor 14, using RAM 16 for fast temporary storage, e.g., of counter data, and the results of operations performed on counter data. Media-access controller 20 allows processor 14 (and, thus, hub H1) to communicate with other network devices, especially a workstation W1, which serves as a network administration workstation. Repeater circuit 12, processor 14, RAM 16, flash memory 18, and media access controller 20 communicate with each other over an internal bus 22. Media access controller 20 also communicates to repeater circuit 12 via a communication link 24 that is similar to the links between the repeater circuit and the ports.

Figure 3:
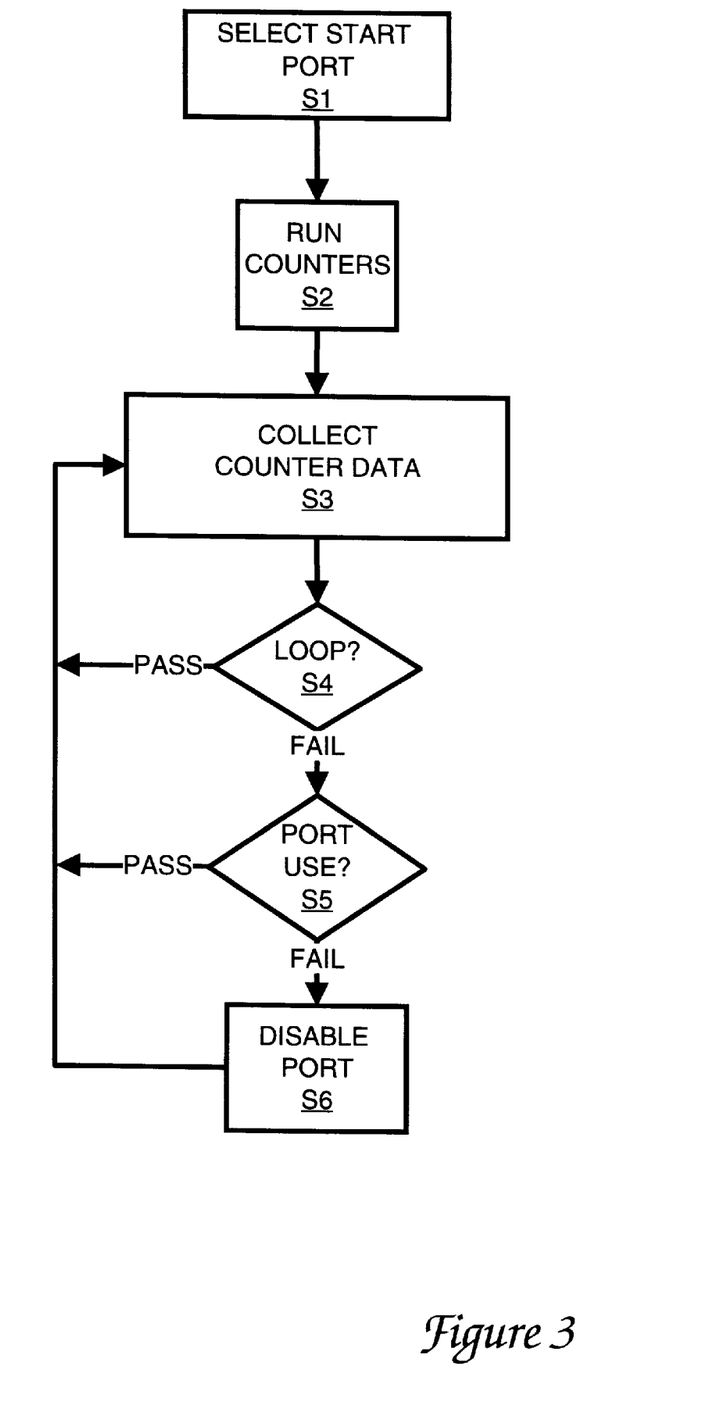
FIG. 3 is a flow chart of a method of the invention implemented by the hub of FIG. 2.

The hub-control program embodies a loop elimination method M1 flow-charted in FIG. 3. At step S1, the hub is initialized, e.g., as power is applied. During this start up step S1, a pseudo-random number generator selects a starting port number using the media-access control address as a seed. Ports are sequenced in order modulo four. Thus, if port P13 is selected as the starting port, the utilization counters are polled in the order P13, P14, P11, P12, P13, and so on.

After initialization, counters are run at step S2. Count data is collected at step S3. Hub utilization data is collected for 1-second intervals. Port utilization data and port cascade data are collected over 25-second intervals. The data collection periods for respective ports are staggered one second apart.

At step S4, a test is run to determine whether or not a loop is indicated on the hub. This test uses the hub utilization as a preliminary test and then proceeds to examine packet contents for duplication. If a loop is not indicated (sufficiently strongly), method M1 returns to data collection step S3. If a loop is indicated, ports are examined for involvement in the loop at step S5. The port for which the most recent data has been collected is examined first. Other ports are examined in succession. If it is determined that none of the ports being examined should be disabled, method M1 returns to data collection step S3. Otherwise, the port is disabled at step S6.

Figure 4:
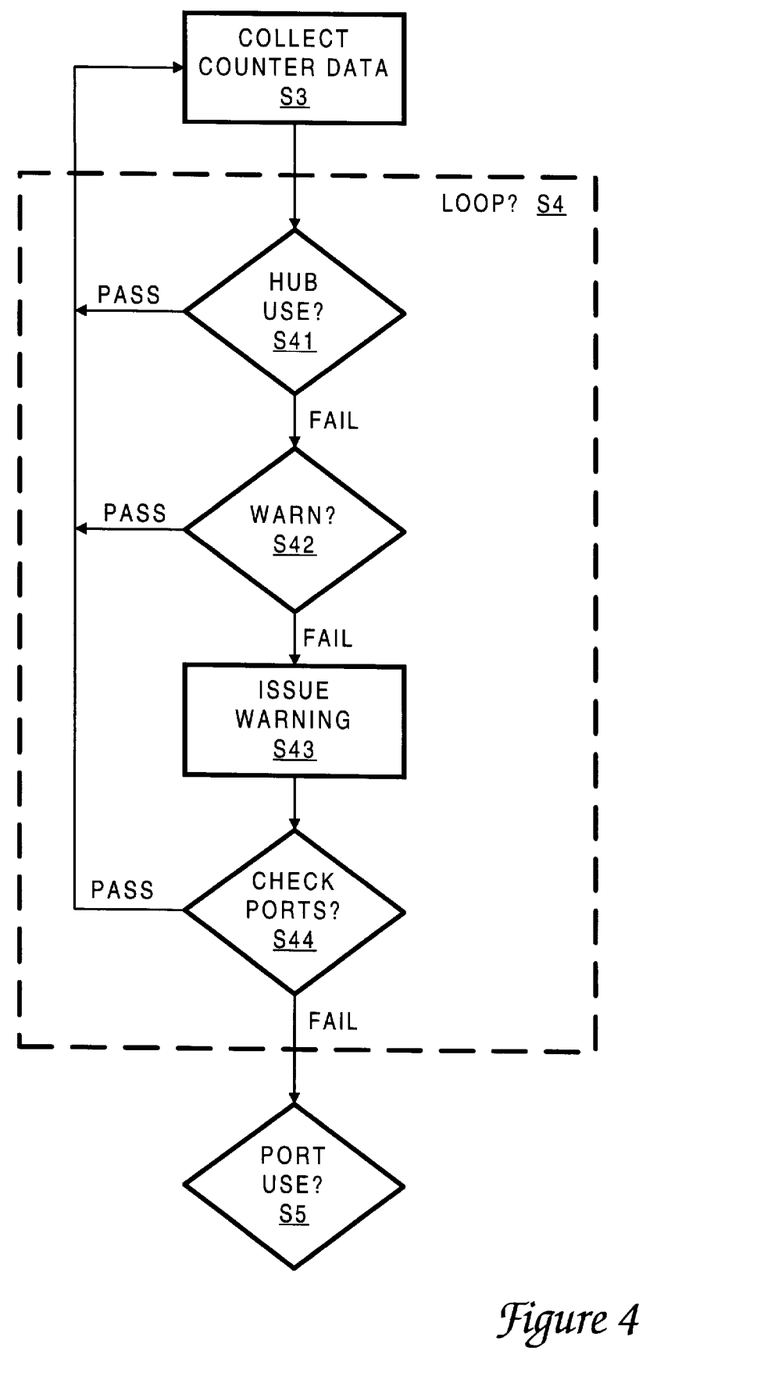
FIG. 4 is a flow chart of a hub-wide loop determination step of the method of FIG. 3.

Loop test step S4 is shown in greater detail in FIG. 4. At a substep S41, hub utilization data collected during step S3 is examined relative to a hub utilization criterion. This criterion includes both a utilization threshold and a hysteresis status. The hysteresis status is memorialized by a flag setting. This flag is set whenever a warning is issued at substep S43 below. The flag is reset upon initialization, upon shut down of a port at step S6, or whenever hub utilization falls below a hysteresis threshold. This hysteresis threshold can be set at or below the most sensitive level at which the hub utilization can be set.

When at substep S41, the hysteresis flag is set, then the hub utilization data is compared with the hysteresis threshold. If the hub utilization is below the hysteresis threshold, the hysteresis flag is reset, otherwise, the hysteresis flag is not reset. In either case, method M1 returns to data collection step S3.

When at substep S41, the hysteresis flag is not set, then the hub utilization data is compared with a utilization threshold at or above the hysteresis threshold. If the utilization threshold is not met, then method M1 returns to data collection step S3. If the utilization threshold is met or exceeded, method M1 proceeds to substep S42 to determine whether a warning should be issued.

In warning-check substep S42, 16,384 packets are acquired. Statistics are kept for up to the first 128 unique CRC error detection codes found in the packets. These statistics are composed of: 1) the number of duplicate CRC codes, i.e., individual CRC codes that occurred more than once; and 2) the total number of duplicate packets, i.e., packets that contained these re-occurring CRC codes. Two ratios are derived from these statistics: 1) a ratio of duplicate CRCs stored to the total number (up to 128) of CRCs stored; and 2) a ratio of duplicate packets stored to the total number (16,384) of packets seen. A "duplicate ratio" equal to the higher of these two ratios is used to indicate the likelihood of a network loop. If the duplicate ratio falls below a warning threshold, method M1 returns to collection step S3. If the warning threshold is met but the higher disable threshold is not met, a warning is issued to network administration workstation W1 at substep S43.

The warning of substep S43 is issued as a "simple network management protocol" (SNMP) trap addressed to network administration workstation W1. Included as part of the trap is a network address in the form of a world-wide web page address. This address is a subpage of a world-wide web page that is the home page embedded in hub H1. The address is entered into an alarm log of a network administration program running on workstation W1.

The network administration program preferably presents the address as a hypertext link. A network administrator has but to click on this link to access the subpage. Alteratively, the address can be accessed by selecting a menu item that calls for accessing the address. The network administration program can call (launching if necessary) a web browser through which the subpage is accessed. When hub H1 receives the address, it generates a subpage with a description of the problem (in this case a loop) that is the cause of the alarm. In other words, hub H1 runs an expert system that diagnoses the problem and offers solutions.

As appropriate, some solutions can be activated by clicking on a button on the subpage. For example, a port can be disabled (or a disabled port can be re-enabled), or a retest can be initiated, or a hysteresis flag can be reset. Thus, manual aspects of network management can be made as simple and user friendly as possible.

If the duplicate ratio meets the warning threshold, a further determination is made to see if it is high enough that the individual ports should be examined for shutdown at step S44. If the duplicate ratio is not that high, method M1 returns to step S3. If the port disable threshold is met, method M1 continues to port-examination step S5.

Figure 5:
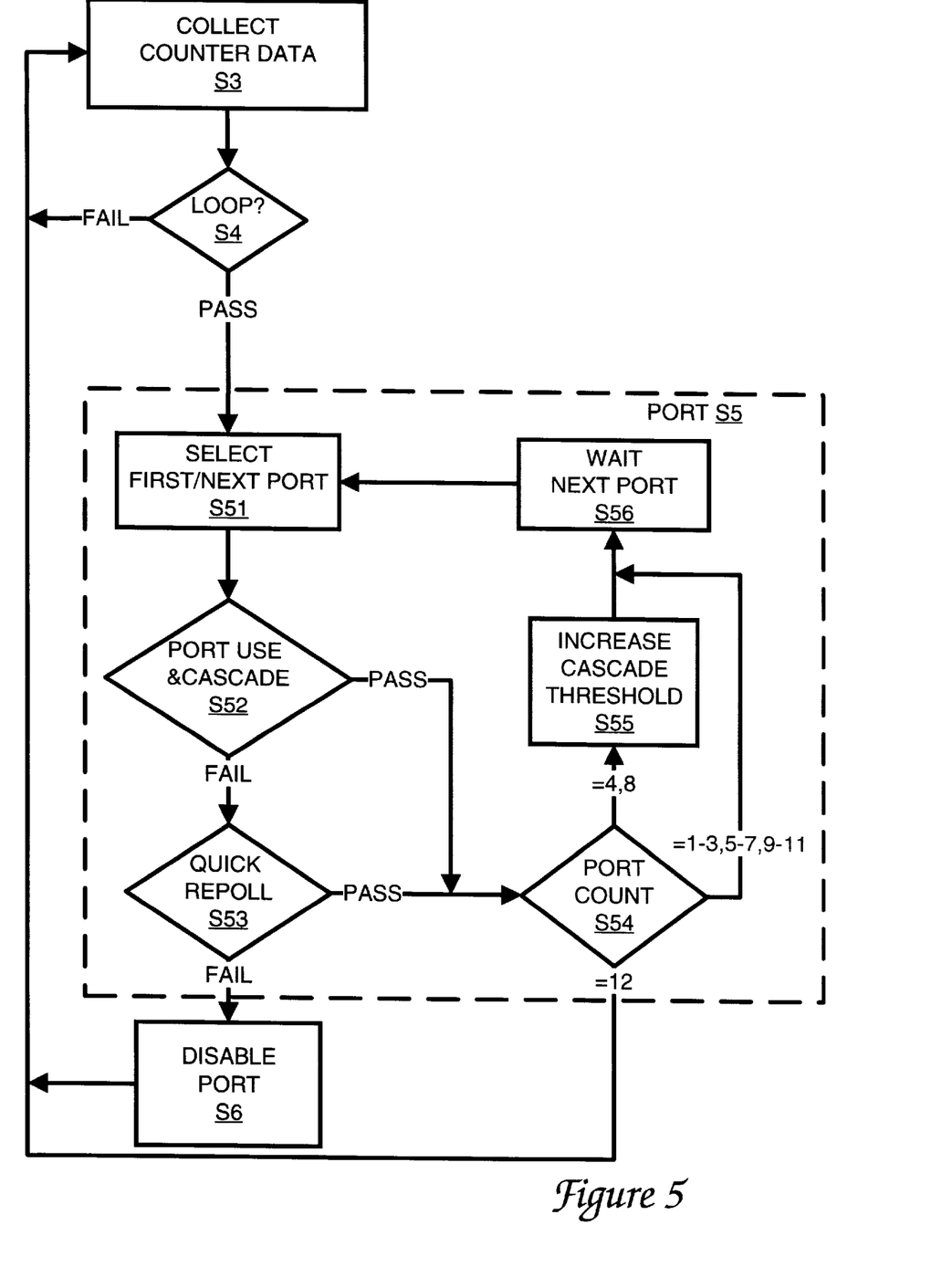
FIG. 5 is a flow chart of a port-wise loop determination step of the method of FIG. 3.

Port examination step S5 is detailed in the flow chart of FIG. 5. At a substep S51, the port for which utilization and cascade data have been most recently collected is selected as the present port for examination. At step S52, the data for the present port is compared to respective utilization and cascade thresholds. Initially, the cascade threshold is set to 3. If the utilization is below threshold and/or if the cascade count is at or above threshold, the port "passes" and method M1 skips to port count substep S54. If the utilization is at or above threshold and the cascade level is below threshold, the method proceeds to re-poll substep S53.

In re-poll substep S53, utilization data is collected for a brief period of 50–100 milliseconds. If a corresponding re-poll utilization threshold is met or exceeded, the port fails the test and the port is disabled at step S6. If the threshold is not met, method M1 proceeds to port count substep S54. This quick re-poll substep prevents the port being examined from being inactivated in the event the loop is eliminated by deactivating a port on another hub before the re-poll is taken. Even if the re-poll begins before the other port is deactivated, the corresponding re-poll threshold may not be met so the local port being examined is not deactivated.

The port count is initially zero. After the first port is tested but not deactivated, the port count is incremented to 1 at substep S54. Thus, for the first iteration of substep S54, the port count becomes 1. Each subsequent iteration of port count substep S54 increments the port count. When the port count is not divisible by 4, method M1 skips to wait-next-port substep S56.

At the initial cascade threshold of 3, non-cascaded ports and recently cascaded ports are considered for disablement. After one complete cycle through the ports, the port count reaches 4; at the port count of 4, method M1 continues to substep S55 at which the cascade threshold is increased from 3 to 31. At this cascade level, moderately cascaded ports as well as non-cascaded ports can be considered for disablement. Upon completion of the second cycle through the ports, the port count reaches 8; at step S55, the cascade threshold is increased from 31 to 255, at which level all ports can be considered for disablement. By increasing the port cascade threshold after each cycling through the ports, method M1 helps ensure that ports coupled to nodes are deactivated before ports coupled to other hubs.

The cascade metric is determined as follows. The cascade metric is an eight-bit value, initially equal to zero. It is determined by examining changes in a counter that tracks address changes received at a port. If, for a 25-second monitoring period, the number of changes is two or more, the port count is shifted left, the former most significant bit is dropped and a 1 is added as the new least significant bit. If for that period, the number of address changes is less than two, the metric is decremented by one. Thus, if a port is cascaded for eight consecutive poll periods, its cascade value is 255. Thus, a port can quickly reach a maximum cascade value and slowly age back toward being a node.

Once the cascade level has been increased at step S55, method M1 continues to wait-next-port substep S56. This step simply involves waiting until the 25-second period of data collection is completed for the next port to be examined. If the next port is the port selected in step S1, this wait can is the remainder of the present 1 second interval plus 21 seconds; otherwise, the wait is the remainder of the present 1 second interval. An alternative is to collect data for shorter intervals or for overlapping intervals for each port so that in every case the wait is less than 1 second.

When, at substep S54, the port count reaches 12, all ports have been considered for disablement, but none have been disabled. Accordingly, method M1 returns to data-collection step S3.

The present invention provides for many alternatives to the foregoing preferred embodiment. Problems other than loops can be addressed. For example, defective node devices can be identified and eliminated. Port restriction less severe than disablement can be implemented. For example, data received at a port can be filtered, rather than cut off entirely. Filtering can be especially effective where the problem relates to a specific type of data, such as broadcast packets.

In general, hubs with greater numbers of ports are accommodated. Many different approaches to ensuring that corresponding ports of different hubs are examined at different times. The present invention also provides for networks in which loop elimination is coordinated among hubs. These and other variations upon and modification to the present invention are provided for by the present invention, the scope of which is defined by the following claims.

What is claimed is:

1. A hub for a computer network, said hub comprising:
plural ports couplable to networkable devices;

counters for counting network events, said counters including port-dedicated counters for counting network events received at respective ones of said ports;

computer readable media for storing a hub management program; and execution means for executing said hub management program, said hub management program when executed selecting pseudorandomly a first of said ports to be sampled, sampling said ports beginning with said pseudorandomly selected first port by reading the ones of said port-dedicated counters dedicated to each respective port, calculating network values of network parameters from the acquired counts, evaluating said network values according to a restriction criterion, and in the event that one of said network values meets said restriction criterion, limiting the transmission from said ports of data received at the respective one of said ports.

2. A hub for a computer network, said hub comprising:

plural ports couplable to networkable devices;

counters for counting network events, said counters including port-dedicated counters for counting network events received at respective ones of said ports;

computer readable media for storing a hub management program; and execution means for executing said hub management program, said hub management program when executed sampling said ports by reading the ones of said port-dedicated counters dedicated to each respective port, calculating network values of network parameters from the acquired counts, evaluating said network values according to a restriction criterion, said restriction criterion being met only if a preliminary long-period criterion is met and only if a subsequent short-period criterion is met, said long-period criterion being at least in part a function of a change in the count of a port-dedicated counter over a relatively long time, said short-period criterion being at least in part a function of a change in the count of a port-dedicated counter over a relatively short time, and in the event that one of said network values meets said restriction criterion, limiting the transmission from said ports of data received at the respective one of said ports.

3. A hub for a computer network, said hub comprising:

plural ports couplable to networkable devices;

counters for counting network events, said counters including port-dedicated counters for counting network events received at respective ones of said ports;

computer readable media for storing a hub management program execution means for executing said hub management program, said hub management program when executed sampling said ports by reading the ones of said port-dedicated counters dedicated to each respective port, calculating network values of network parameters from the acquired counts, evaluating said network values according to a restriction criterion, said restriction criterion being met only if a cascadeness criterion is met, said cascadedness criterion being a function of a cascadeness value of a cascadeness parameter indicating a probability that communications from plural devices are being received by a port.

4. A hub as recited in claim 3 wherein said restriction criterion is met only if a cascadeness criterion is met, said cascadedness criterion being a function of a cascadeness value of a cascadeness parameter indicating a duration of time that communications from plural devices are being received by a port.

5. A hub as recited in claim 4 wherein said sampling involves plural cycles, each port being sampled in each cycle, said cycles including at least a first cycle and a last cycle, said cascadeness criterion being cycle dependent in that it is relaxed each cycle so that the set of ports subject to restriction in said first cycle is a subset of the set of ports subject to restriction in said last cycle.

6. A hub as recited in claim 5 wherein said limiting involves disabling the respective one of said ports.

7. A network management method executable by a hub incorporated in a network including other hubs, said method comprising the steps of:

a) examining each port in turn, for each port determining whether or not a restriction criterion is met therefor said restriction criterion requiring that the change of a count over a preliminary relatively long time meet a first threshold criterion and that a change of a count over a subsequent relatively short time meet a second threshold criterion; and b) restricting said port if said condition is met.

8. A network management method executable by a hub incorporated in a network including other hubs, said method comprising the steps of:

pseudorandomly selecting one of said ports to be examined first, examining each port in turn, for each port determining whether or not a restriction criterion is met therefor; and restricting said port if said condition is met.

9. A network management method executable by a hub incorporated in a network including other hubs, said method comprising the steps of:

a) examining each port in turn, for each port determining whether or not a restriction criterion is met therefore, said restriction criterion requiring that a cascadeness criterion be met; and b) restricting said port if said condition is met.

10. A network management method as recited in claim 9 wherein, if no port of said hub is restricted after each port has been examined once, each port in turn is examined a second time, for each port, said cascadeness criterion is more strict the first time it is examined and more relaxed the second time it is examined.

11. A network management method as recited in claim 10 wherein said restriction criterion requires that the change of a count over a preliminary relatively long time of a problem-related parameter meet a first threshold criterion and that a change of a count over a subsequent relatively short time meet a second threshold criterion.

* * * * *